Patented Nov. 10, 1931

1,831,716

UNITED STATES PATENT OFFICE

BERTRAM MAYER AND HUGO SIEBENBÜRGER, OF BASEL, SWITZERLAND, ASSIGNORS TO FIRM SOCIETY OF CHEMICAL INDUSTRY IN BASLE, OF BASEL, SWITZERLAND

VAT-DYESTUFFS OF THE DIBENZANTHRONE SERIES AND PROCESS OF MAKING SAME

No Drawing. Application filed January 16, 1930, Serial No. 421,305, and in Switzerland January 25, 1929.

The present invention refers to the manufacture of new vat-dyestuffs of the dibenzanthrone series which are particularly valuable for the production of fast tints on the fiber. It comprises the process of making these new products, the new products themselves, and the material which has been dyed with the new products.

It has been found that new vat-dyestuffs are obtained by treating amino-dibenzanthrones, such as, for example, amino-dibenzanthrone itself, or dimethyl-amino-dibenzanthrone, with an halogenated quinone of the benzene series, such as bromo-quinones or tetra-chloroquinone or di-chloroquinone. The new dyestuffs, the constitution of which is not known, form dark, blackish powders. They dissolve in concentrated sulfuric acid to dark violet solutions, and in boiling nitrobenzene or aniline to blue-green solutions. From a blue vat they dye vegetable fiber deep green to blue-green tints having excellent properties of fastness, particularly to chlorine.

The following example illustrates the invention, the parts being by weight:

Example 9.5 parts of amino-dibenzanthrone (obtainable by reducing the pure nitro-dibenzanthrone made as described in U. S. Patent No. 1,513,851) are suspended in 190 parts of nitrobenzene and the suspension is mixed with 9.5 parts of tetra-chloroquinone. The mixture is heated while stirring to 190° C. The reaction begins at about 100° C. as may be recognized by the change of colour. After having heated the mixture for some hours at 190-200° C. it is allowed to cool to about 100° C., 100 parts of nitrobenzene are now added and the dyestuff which has separated is filtered at about 70° C. This dyestuff is washed with nitrobenzene, and then with alcohol and dried.

The new vat-dyestuff containing chlorine is a reddish black powder. It dissolves in concentrated sulfuric acid to a dull violet solution, from which when it is poured into water blue-green flocks separate. In boiling nitrobenzene and in aniline the dyestuff dissolves to a blue-green solution. Its blue vat dyes cotton fast deep blue-green tints. The proportions named in this example may be varied within certain limits.

Other solvents than nitrobenzene may be used. The reaction may also be conducted in presence of an agent which binds acid, such as sodium acetate or sodium carbonate.

What we claim is:—

1. A manufacture of vat-dyestuffs of the dibenzanthrone series by treating amino-dibenzanthrones with an halogenated quinone of the benzene series at temperatures over 100° C.

2. A manufacture of vat-dyestuffs of the dibenzanthrone series by treating amino-dibenzanthrone with an halogenated quinone of the benzene series at temperatures over 100° C.

3. A manufacture of vat-dyestuffs of the dibenzanthrone series by treating amino-dibenzanthrone with tetra-chloroquinone at temperatures over 100° C.

4. As new products the products of the reaction between the halogenated quinones of the benzene series and amino-dibenzanthrones, which products form blackish powders which dissolve in concentrated sulfuric acid to dark violet solutions and in boiling nitrobenzene or aniline to blue-green solutions, dyeing vegetable fiber from a blue vat deep green to blue-green tints of excellent properties of fastness, particularly to chlorine.

5. As new products the products of the reaction between the halogenated quinones of the benzene series and amino-dibenzanthrone, which products form blackish powders which dissolve in concentrated sulfuric acid to dark violet solutions and in boiling nitrobenzene or aniline to blue-green solutions, dyeing vegetable fiber from a blue vat deep green to blue-green tints of excellent properties of fastness, particularly to chlorine.

6. As new products the products of the reaction between tetra-chloroquinone and amino-dibenzanthrone, which products form blackish powders which dissolve in concentrated sulfuric acid to dark violet solutions and in boiling nitrobenzene or aniline to blue-green solutions, dyeing vegetable fiber from a blue vat deep green to blue-green tints of excellent properties of fastness, particularly to chlorine.

In witness whereof we have hereunto signed our names this 7th day of January, 1930.

BERTRAM MAYER.
HUGO SIEBENBÜRGER.